(12) United States Patent
Agnihotri et al.

(10) Patent No.: US 9,875,012 B2
(45) Date of Patent: Jan. 23, 2018

(54) MEDIA SHARING BETWEEN DEVICES USING DRAG AND DROP GESTURE

(71) Applicant: Sony Corporation, Tokyo (JP)

(72) Inventors: Tanmay Agnihotri, San Diego, CA (US); Aravind Asam, San Diego, CA (US)

(73) Assignee: SONY CORPORATION, Tokyo (JP)

(*) Notice: Subject to any disclaimer, the term of this patent is extended or adjusted under 35 U.S.C. 154(b) by 323 days.

(21) Appl. No.: 14/818,683

(22) Filed: Aug. 5, 2015

(65) Prior Publication Data

US 2017/0038937 A1   Feb. 9, 2017

(51) Int. Cl.
| | |
|---|---|
| G06F 3/0486 | (2013.01) |
| H04N 21/41 | (2011.01) |
| H04N 21/472 | (2011.01) |
| G06F 3/0484 | (2013.01) |
| H04N 21/431 | (2011.01) |

(52) U.S. Cl.
CPC ........ G06F 3/0486 (2013.01); G06F 3/04842 (2013.01); H04N 21/4126 (2013.01); H04N 21/47205 (2013.01); H04N 21/47217 (2013.01); H04N 21/431 (2013.01)

(58) Field of Classification Search
CPC .................................................... G06F 3/0486
See application file for complete search history.

(56) References Cited

U.S. PATENT DOCUMENTS

| | | | | |
|---|---|---|---|---|
| 9,348,495 | B2* | 5/2016 | Young | G06F 3/04847 |
| 2009/0049384 | A1* | 2/2009 | Yau | G06F 3/04817 |
| | | | | 715/716 |
| 2009/0140986 | A1 | 6/2009 | Karkkainen et al. | |
| 2011/0119611 | A1* | 5/2011 | Ahn | G06F 3/0346 |
| | | | | 715/769 |
| 2011/0145753 | A1* | 6/2011 | Prakash | G06F 3/0481 |
| | | | | 715/783 |
| 2012/0278727 | A1 | 11/2012 | Ananthakrishnan et al. | |

(Continued)

OTHER PUBLICATIONS

Control Netflix on your PS3 from an Android or Apple Device by Osas Obaiza as published at https://ps3.wonderhowto.com/how-to/control-netflix-your-ps3-from-android-apple-device-kindle-fire-nook-0139432/ as of Apr. 16, 2013 hereafter referred to as (Obaiza).*

(Continued)

*Primary Examiner* — William Bashore
*Assistant Examiner* — Nathan Shrewsbury
(74) *Attorney, Agent, or Firm* — John L. Rogitz

(57) ABSTRACT

In an embodiment, a computer memory that is not a transitory has instructions executable by a processor to present on a display of a mobile device a user interface (UI) facilitating media shifting between the mobile device and an audio video device (AVD) separate from the mobile device. The UI has a grid of thumbnails, with each thumbnail being associated with a respective media asset. Responsive to a user touching and dragging a first thumbnail of the grid, a drop region is presented outside the grid indicating that a drop of the thumbnail will cause the media asset associated with the first thumbnail to be presented on the AVD. Responsive to a user releasing the first thumbnail in the drop region, a signal is sent to the AVD to cause the AVD to present the media asset associated with the first thumbnail.

20 Claims, 3 Drawing Sheets

(56) References Cited

U.S. PATENT DOCUMENTS

2013/0125016 A1  5/2013  Pallakoff et al.

OTHER PUBLICATIONS

Sexy Chromecast trick: It can play video files from any computer by Christopher MacManus as published on by CNet.com as of Jul. 25, 2013 (MacManus).*

Netflix adds personalized profiles to streaming service by Mike Snider USA Today Aug. 1, 2013. (Snider).*

EZ Cast Manual available at iezvu.com as of Sep. 16, 2014 (EZ Cast).*

Jayson Turney, Jason Alexander, Andreas Bulling, Dominik Schmidt, Hans Gellersen, "Eye Pull, Eye Push: Moving Objects between Large Screens and Personal Devices with Gaze and Touch", School of Computing and Communications, Lancaster University, United Kingdom, 2013.

* cited by examiner

MEDIA SHARING BETWEEN DEVICES USING DRAG AND DROP GESTURE

TECHNICAL FIELD

The application relates generally to media sharing between devices using a drag and drop gesture.

BACKGROUND

As example computer ecosystem, or digital ecosystem, which is an adaptive and distributed socio-technical system that is characterized by its sustainability, self-organization, and scalability, that is pertinent to present principles is a network in which, a companion device such as a tablet computer shares content with and controls playback on a large display device.

SUMMARY

In an embodiment, a computer memory that is not a transitory has instructions executable by a processor to present on a display of a mobile device a user interface (UI) facilitating media shifting between the mobile device and an audio video device (AVD) separate from the mobile device. The UI has a grid of thumbnails, with each thumbnail being associated with a respective media asset Responsive to a user touching and dragging a first thumbnail of the grid, a drop region is presented outside the grid indicating that a drop of the thumbnail will cause the media asset associated with the first thumbnail to be presented on the AVD. Responsive to a user releasing the first thumbnail in the drop region, a signal is sent to the AVD to cause the AVD to present the media asset associated with the first thumbnail.

In some implementations, the instructions are executable to, responsive to a user releasing the first thumbnail in the drop region, cause the AVD to present a player control panel on the AVD. The player control panel includes control selectors for causing the media asset associated with the first thumbnail to play, rewind, and fast forward a video associated with the first thumbnail. The player control panel may indicate by name a user of the mobile device and moreover may include an image of the first thumbnail.

The signal sent to the AVD can include a wireless signal, and the wireless signal can represent information useful by the AVD in rendering the player control panel.

The UI presented on the mobile device may include an image of a user of the mobile device and may also include an alpha-numeric rendering of the name of a user of the mobile device.

A media asset represented by a thumbnail in the grid of the UI presented on the mobile device can represent a playlist of content. A media asset represented by a thumbnail in the grid of the UI presented on the mobile device can represented a rich site summary (RSS) feed. The grid of thumbnails may be scrollable to scroll onto the mobile device additional thumbnails representing respective media assets, such that a user can continue to browse content using the mobile device while controlling the AVD to play the media asset associated with first asset.

In another aspect, a method includes presenting on a display of a mobile device a user interface (UI) for media play coordination with an audio video device (AVD) separate from the mobile device. The UI has a grid of thumbnails, each associated with a respective media asset, and responsive to a user touching and dragging a first thumbnail of the grid, a drop region is presented visibly on the display outside fee grid indicating that a drop of the thumbnail will cause the media asset associated wife fee first thumbnail to be presented on the AVD. Responsive to a user releasing the first thumbnail in the drop region, a signal is sent to the AVD to cause the AVD to present the media asset associated with the first thumbnail.

In another aspect a computer memory that is not a transitory signal has instructions executable by a processor to present on a display of an audio video device (AVD) a user interface (UI). The instructions are executable to receive from a mobile device separate from the AVD a signal to cause the AVD to present a media asset associated with a first selector presented on the mobile device, and responsive to information received from the mobile device, present on the AVD a player control panel including control selectors for causing the media asset associated with the first selector on the mobile device to play, rewind, and fast forward a video associated with the first selector.

The details of the present application, both as to its structure and operation, can best be understood in reference to the accompanying drawings, in which like reference numerals refer to like parts, and in which:

BRIEF DESCRIPTION OF TEE DRAWINGS

DETAILED DESCRIPTION

Figure 1:
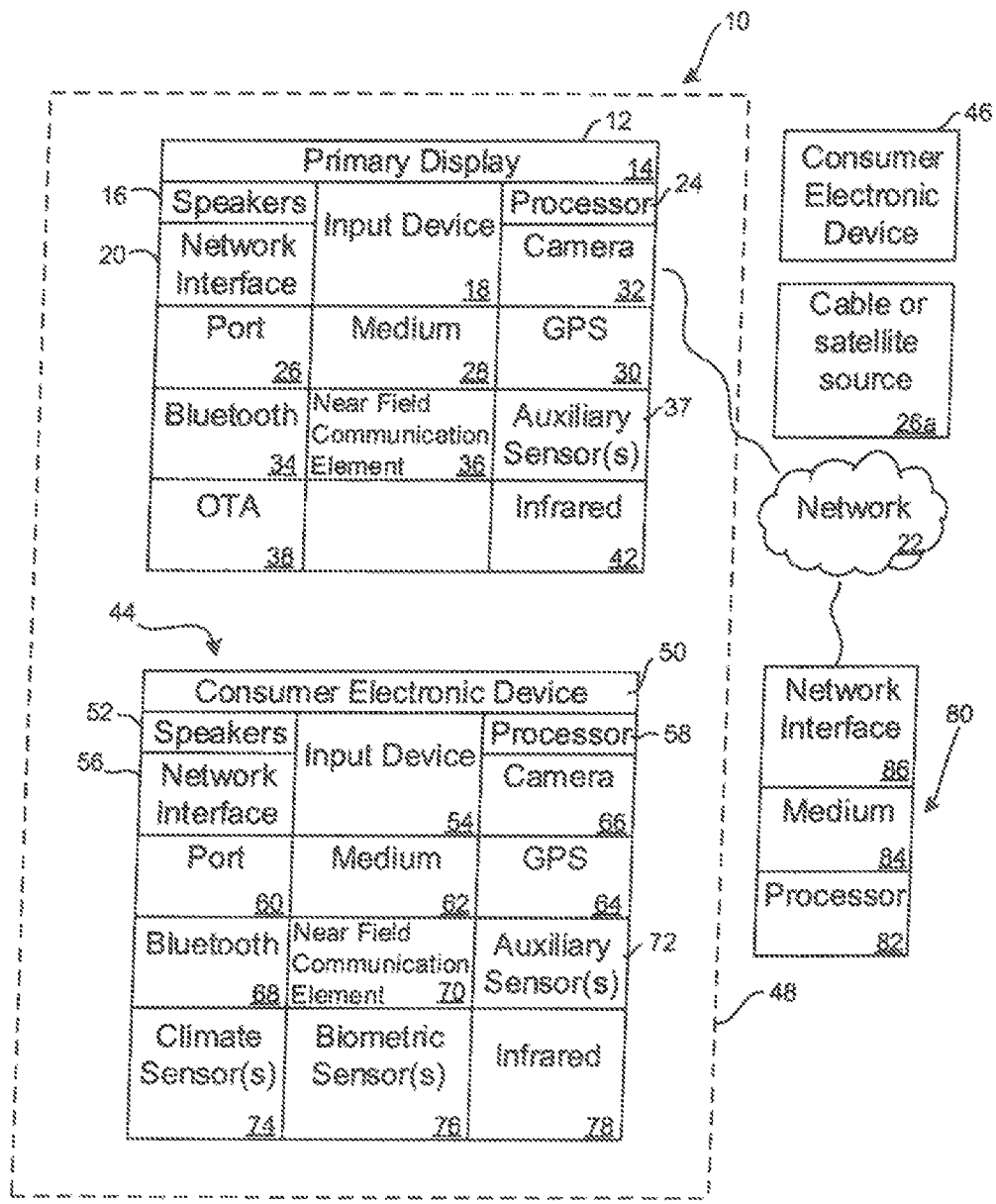
FIG. 1 is a block diagram of an example system including an example in accordance with present principles.

This disclosure relates generally to computer ecosystems including aspects of consumer electronics (CE) device networks. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted, by the Internet server's discussed below.

Servers and/or gateways may include one or more processors executing instructions that configure the servers to receive and transmit data over a network such as the Internet. Or, a client and server can be connected over a local intranet or a virtual private network, A server or controller may be instantiated by a game console such as a Sony Playstation (trademarked), a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system; instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the figures may be combined, interchanged or excluded from other embodiments.

"A system, having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). However, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may be touch-enabled for receiving user input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below.

The AVDD 12 may further include one or more computer memories 28 such as disk-based or solid state storage that are not transitory signals. In some cases embodied in the chassis of the AVDD as standalone devices or as a personal video recording device (PVR) or video disk player either internal or external to the chassis of the AVDD for playing back AV programs or as removable memory media. Also in some embodiments, the AVDD 12 can include a position or location receiver such as but not limited to a cellphone receiver, GPS receiver and/or altimeter 30 that is configured to e.g. receive geographic position information from at least one satellite or cellphone tower and pro vide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 3 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVDD 12 may include an over-the-air TV broadcast port 38 for receiving OTH TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used. The devices 12, 44, 46 in the network may communicate using digital living network alliance (DLNA) protocol and may employ device discovery using universal plug-n-play (UPnP) principles. In this way, the devices are aware of other devices in the network.

In the example shown, to illustrate present principles all three devices 12, 44, 46 are assumed to be members of an entertainment network in, e.g., a home, or at least to be present in proximity to each other in a location such as a house. However, for present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller, and accordingly may have one or more of the components described below. The second CE device 46 without limitation may be established by a video disk player such as a Blu-ray player, a game console, and the like. The first CE device 44 may be a remote control (RC) for, e.g., issuing AV play and pause commands to the AVDD 12, or it may be a more sophisticated device such as a tablet computer, a game controller communicating via wired or wireless link with a game console implemented by the second CE device 46 and controlling video game presentation on the AVDD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone tor e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 42 such as an IR data association (IRDA) device. A battery (not shown) may be provided for powering the first CE device 44. The CE device 44 may communicate with the AVDD 12 through any of the above-described communication modes and related components.

The second CE device 46 may include some or ail of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interlace such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
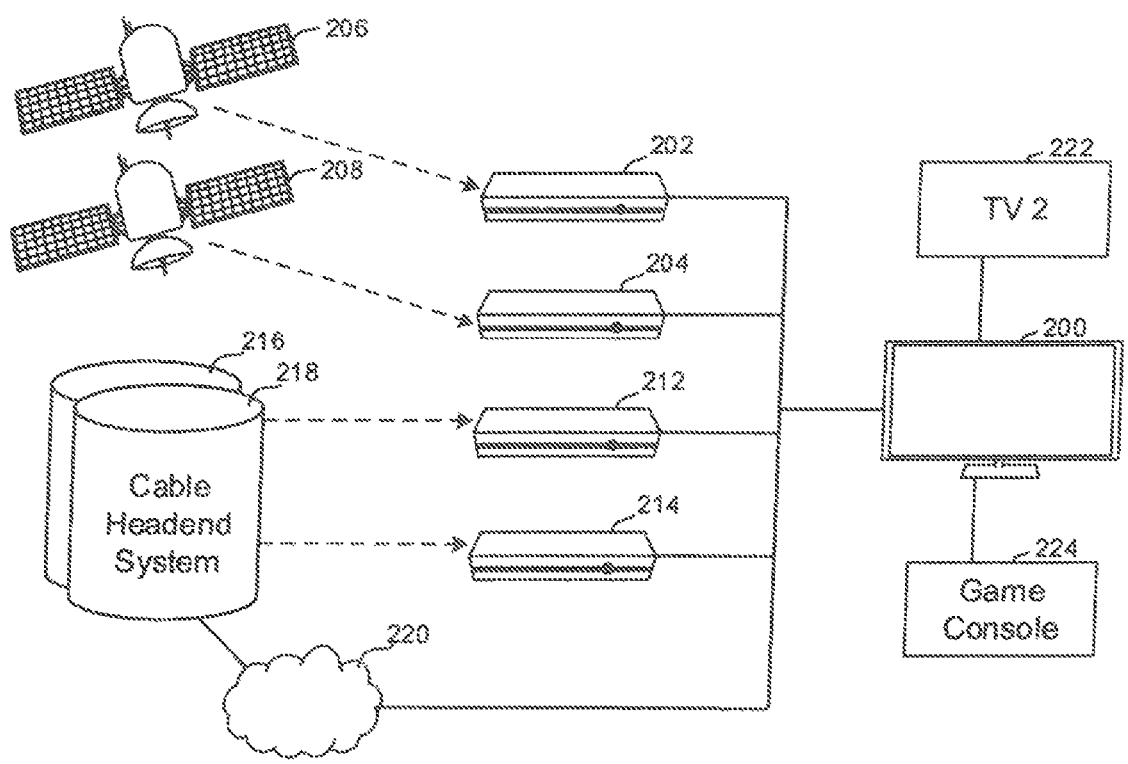
FIG. 2 is a block diagram of another system that can use the components of FIG. 1.

Now referring to FIG. 2, an AVDD 200 that may incorporate some or all of the components of the AVDD 12 in FIG. 1 is connected to at least one gateway for receiving content, e.g., UHD content such as 4K or 8K content from the gateway. In the example shown, the AVDD 200 is connected to first and second satellite gateways 202, 204, each of which may be configured as a satellite TV set top box for receiving satellite TV signals from respective satellite systems 206, 208 of respective satellite TV providers.

In addition or in lieu of satellite gateways, the AVDD 200 may receive content from one or snore cable TV set top box-type gateways 210, 212, each of which receives content from a respective cable head end 214, 216.

Yet again, instead of set-top box like gateways, the AVDD 200 may receive content from a cloud-based gateway 220. The cloud-based gateway 220 may reside in s network interface device that is local to the AVDD 200 (e.g., a modem of the AVDD 200) or it may reside in a remote Internet server that sends Internet-sourced content to the AVDD 200. In any case, the AVDD 200 may receive multimedia content such as UHD content from the Internet through the cloud-based gateway 220. The gateways are computerized and thus may include appropriate components of any of the CE devices shown in FIG. 1.

In some embodiments, only a single set top box-type gateway may be provided using, e.g., the present assignee's remote viewing user interface (RVU) technology.

Tertiary devices may be connected, e.g., via Ethernet or universal serial bus (USB) or WiFi or other wired or wireless protocol to the AVDD 200 in a home network (that may be a mesh-type network) to receive content from the AVDD 200 according to principles herein. In the non-limiting example shown, a second TV 222 is connected to the AVDD 200 to receive content therefrom, as is a video game console 224. Additional devices may be connected to one or more tertiary devices to expand the network. The tertiary devices may include appropriate components of any of the CE devices shown in FIG. 1.

Figure 3:
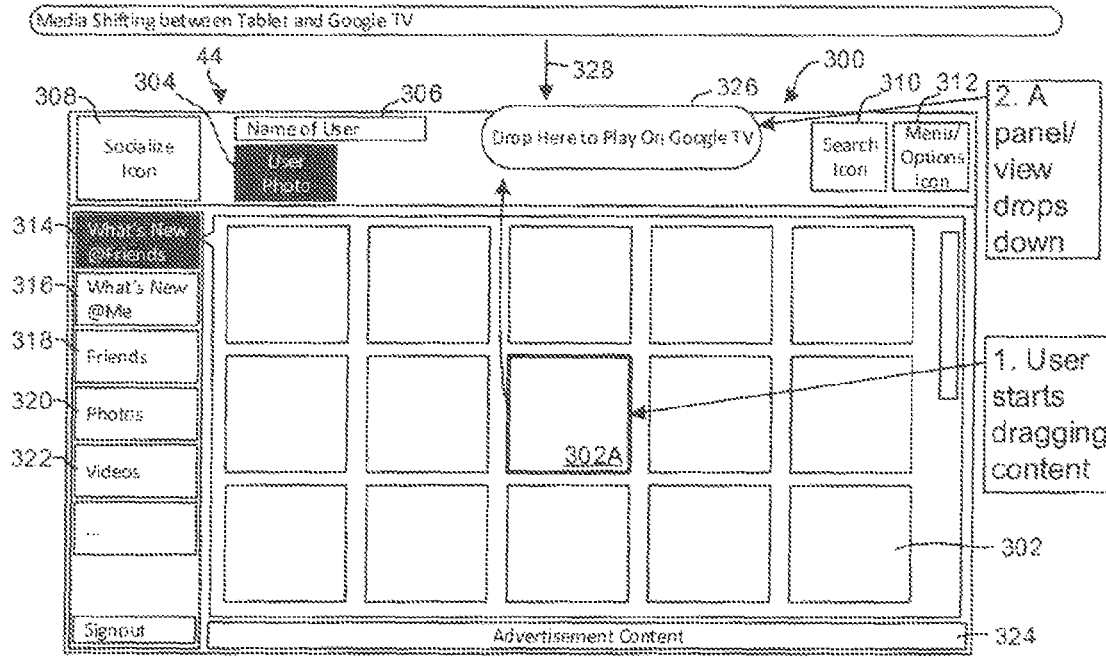
FIG. 3 is a screen shot of an example user interface (UI) that can be presented on the mobile control device.
Figure 4:
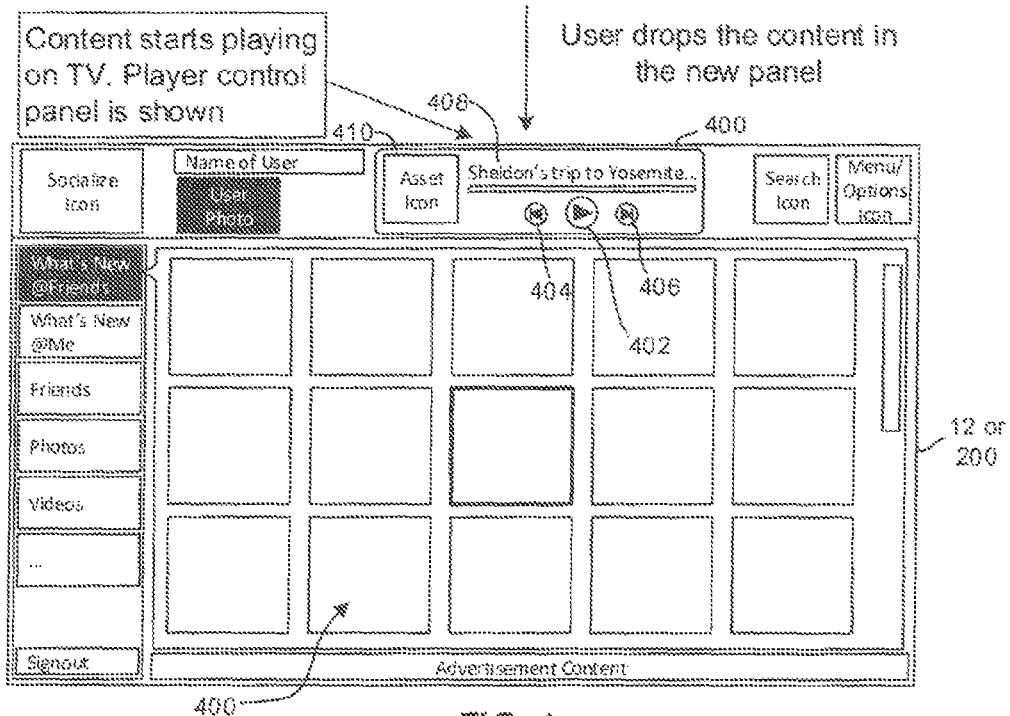
FIG. 4 is a screen shot of an example user interface (UI) that can be presented on the audio video display device (AVDD) with which media is being shared.

Suppose the first CE device 44 is a mobile device such as a tablet computer or smart phone or other similar device, and that a user seeks to use it to control the AVDD 12 or 200. FIGS. 3 and 4 show respective user interfaces (UIs) 300, 400 that can be presented on the displays of the mobile device and the AVDD.

In FIG. 3, the UI 300 that may be presented on the mobile device includes a grid of thumbnails 302, with each thumbnail being associated with a respective media asset, e.g., a TV channel, a web site, a play list a rich site summary (RSS) feed, etc. The example grid shown contains three rows of five thumbnails each arranged in a rectilinear configuration, although other grid sizes and configurations may be used. A thumbnail may be established using a frame of video, or other image from the underlying media asset.

The grid of thumbnails 302 may be scrollable left-to-right and right-to-lift and/or up-to-down and down-to-up to scroll onto the mobile device additional thumbnails representing respective media assets, such that a user can continue to browse content using the mobile device while controlling the AVD to play the media asset associated with first asset. Navigation, including scrolling and thumbnail selection, may be effected using a touch screen, with user gestures against the touchscreen (such as swipes) causing scrolling and other user gestures (such as a tap) on a thumbnail causing selection of the thumbnail. Alternatively, navigation may be provided by a point-and-click input device or by voice activation.

As shown in FIG. 3, the UI 300 presented on the mobile device may include an image of a user of the mobile device in an image region 304 and may also include an alphanumeric rendering of the name of a user of the mobile device in a name region 306. Both regions 304, 306 are outside the grid of thumbnails as shown.

Additionally, the UI 300 may include a social network icon 308. The social network icon 308 may be selectable to access a social network site or social network widget to permit communication with the social network using a window opened on the display for that purpose.

Moreover, the UI 300 may include a search icon 310. When selected, a dialog box may be opened on the UI 300 permitting the user to enter (e.g., by means of a virtual or physical keyboard or keypad) search terms to search for media assets which when found may have thumbnails representing them appear automatically on the UI 300 in the grid. A menu/options icon 312 may also be provided which when selected may cause a drop-down list of device options to be superimposed onto the UI 300. Or, selection of the icon 312 may populate the grid of thumbnails with thumbnails representing various device options for selection of a thumbnail to access and edit the underlying option.

While the above-described icons 304-312 are presented in a row above the grid of thumbnails, it is to be understood that they may be presented in a row below the grid, or in a column on the left or right of the grid, or elsewhere.

In the example shown, a column of selectors may be arranged along the left side of the grid of thumbnails. The selectors may include "what's new" social network selectors 314, 316 which can be selected to invoke respective "what's new" presentations from the respective social networks. In the example shown, "what's new @Friends" has been selected, and the grid of thumbnails 302 consequently displays thumbnails related to media assets that are identified in the "what's new" feature of the social network "friends". Thus, in the example shown selection of the selector 314 has caused the mobile device to access, wired or wirelessly, the "Friends" network and obtain from the "what's new" directory thereof a list of media assets, which are reflected by the various thumbnails 302.

Selectors 318, 320, 322 may also be provided for selection to cause the mobile device to respectively access directories of friends, photos, and videos to cause the thumbnails 302 to be populated with images relating to respective media assets in the selected directory. Other selectors may be provided for causing the mobile to access the corresponding directory (be it local or on a network such as a social network) and to populate the grid of thumbnails with images derived from media assets returned by the selected directory.

An advertising window 324 may be presented below the grid of thumbnails to present advertising images therein.

Together, FIGS. 3 and 4 illustrate the cooperation between the UIs 300, 400, which, as shown, may be substantially identical to each other with the exceptions shown.

More particularly, suppose a user of the mobile device places a finger or cursor on a thumbnail 302A and begins to drag the thumbnail by moving the linger or cursor. This action causes a drop region 326 to be presented as indicated by the arrow 328, whereas prior to dragging the thumbnail 302A the drop region 326 is not presented. In the example shown, the drop region 326 is presented outside the grid of thumbnails 302, and as shown it indicates that a drop of the selected thumbnail 302A will cause the media asset associated with the first thumbnail to be presented on the AVDD. Note that when more than one rendering device is discovered on the network using the above-mentioned DLNA/UPnP process or other network discovery process, the drop region 326 may include respective sub-regions indicating by image, icon, text, or a combination thereof which discovered rendering device can be "thrown" content to by dropping content in which sub-region.

Responsive to a user releasing the selected thumbnail 302A in the drop region 326 (or appropriate sub-region thereof when plural rendering devices are discovered), a signal is sent by the mobile device to the AVDD to cause the AVDD to present the media asset associated with the thumbnail 302A. This may be accomplished by the mobile device sending to the AVDD an identification of the media asset as obtained by the media device from metadata associated with the media asset, with the AVDD then using the identification, which can include, e.g., a network address, channel number, etc. to access and play the media asset. Or, the mobile device may, responsive to a drop of the thumbnail 302A in the drop region 326, stream or otherwise download the media asset itself to the AVDD, whether from local storage on the mobile device or by the mobile device accessing the network address or channel number or other source of the media asset is identified, e.g., in metadata of the media asset and then relaying the media asset to the AVDD.

In one embodiment, when a thumbnail 302A is dropped into the drop area 326 of the UI 300 on the mobile device, the mirroring grid of thumbnails presented on the UI 400 of the AVDD may disappear and the media asset presented fall-screen (or at least in the area formerly occupied by the grid in the UI 400) on the AVDD. In other implementations, the selected media asset may be caused to play in the grid on the UI 400 of the AVDD in the same location as the location of the selected thumbnail 302A is in the UI 300 on the mobile device. Yet again, after dropping the thumbnail 302A in the drop region 326, the user may then touch a location on the grid of thumbnails 302 presented on the mobile device to cause the media asset to be played in the corresponding thumbnail location on the AVDD.

In the illustrated example, in addition to a drop of a thumbnail 302A in the drop region 326 causing the mobile device to command the AVDD to play the underlying media asset, a player control panel 400 may be presented on the AVDD. The player control panel 400 may include control, selectors for causing the media asset associated with the first thumbnail to play (402), rewind (404), and fast forward (406) a video associated with the first thumbnail. The player control panel may indicate at 408 by name a user of the mobile device and description of the media asset, and moreover may include at 410 an image of the thumbnail 302A. The control selectors may be selected by touching them or using a selector input device such as a remote control. Note that the signal sent from the mobile device to the AVDD can include information useful by the AVDD in rendering the player control panel 400, e.g., configuration and control information regarding the panel 402.

In some embodiments, once the media asset begins playing on the AVDD, a player control panel similar to the player control panel 400 on the AVDD may be presented on the mobile device. By using the mirroring selectors on the mobile device, the user can cause the mobile device to send play, rewind, fast forward, etc. commands to the AVDD such that play of the media asset on the AVDD may be controlled using the mobile device instead of or in addition to controlling play using the player control panel 400 on the AVDD.

It should be noted that the above-described operation may be reciprocal. This means that a user can select and drag a thumbnail in the grid presented on the AVDD to cause a drop region similar to the drop region 326 to be presented on the AVDD, and then upon release of the thumbnail in the drop region of the AVDD, the AVDD can command the mobile device to begin playing the underlying media asset, with the mobile device then presenting a player control panel similar to the player control panel 400 shown in FIG. 4.

Thus, a user of the mobile device may cause media assets to be played on the AVDD while using the mobile device to continue to browse for content using the mobile device. Note that communication between the mobile device and AVDD may be effected using digital living network alliance (DLNA) protocols, or AirPlay protocol, or digital mobile radio (DMR) protocol, or other appropriate network protocol.

The above methods may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD Rom or Flash drive. The software code instructions may alternatively be embodied in a transitory arrangement such as a radio or optical signal, or via a download over the internet.

It will be appreciated that whilst present principals have been described with reference to some example embodiments, these are not intended to be limiting, and that various alternative arrangements may be used to implement the subject matter claimed herein.

What is claimed is:

1. A computer memory that is not a transitory signal and that comprises instructions executable by at least one processor to:

present on a display of a mobile device a user interface (UI) facilitating media shifting between the mobile device and an audio video device (AVD) separate from the mobile device, the UI comprising a grid of thumbnails each associated with a respective media asset;

responsive to a user touching and dragging a first thumbnail of the grid, present a drop region outside the grid indicating that a drop of the thumbnail will cause the media asset associated with the first thumbnail to be presented on the AVD; and responsive to a user releasing the first thumbnail in the drop region, send a signal to the AVD to cause the AVD to present the media asset associated with the first thumbnail, wherein responsive to the first thumbnail being released in the drop region, a mirroring grid of thumbnails presented on the AVD presents the media asset to play in the mirroring grid on the AVD in a location in the mirroring grid corresponding to a user-touched display location on the mobile device.

2. The computer memory of claim 1, wherein the instructions are executable to:

responsive to a user releasing the first thumbnail in the drop region, cause the AVD to present a player control panel on the AVD, the player control panel including control selectors for causing the media asset associated with the first thumbnail to play, rewind, and fast forward a video associated with the first thumbnail.

3. The computer memory of claim 1, wherein the player control panel indicates by name a user of the mobile device.

4. The computer memory of claim 1, wherein the player control panel includes an image of the first thumbnail.

5. The computer memory of claim 2, wherein the signal sent to the AVD includes a wireless signal, and the wireless signal represents information useful by the AVD in rendering the player control panel.

6. The computer memory of claim 1, wherein the includes an image of a user of the mobile device.

7. The computer memory of claim 1, wherein the UT includes a name of a user of the mobile device.

8. The computer memory of claim 1, wherein at least one media asset represented by a thumbnail in the grid of the UI presented on the mobile device is a playlist of content.

9. The computer memory of claim 8, wherein at least one media asset represented by a thumbnail in the grid of the UI presented on the mobile device is a rich site summary (RSS) feed.

10. The computer memory of claim 1, wherein the grid of thumbnails is scrollable to scroll onto the mobile device additional thumbnails representing respective media assets, such that a user can continue to browse content using the mobile device while controlling the AVD to play the media asset associated with first asset.

11. A method comprising:

presenting on a display of a mobile device a user interface (UI) for media play coordination with an audio video device (AVD) separate from the mobile device, the UI comprising a grid of thumbnails each associated with a respective media asset;

responsive to a user touching and dragging a first thumbnail of the grid, presenting a drop region outside the grid indicating that a drop of the thumbnail will cause the media asset associated with the first thumbnail to be presented on the AVD; and responsive to a user releasing the first thumbnail in the drop region, sending a signal to the AVD to cause the AVD to present the media asset associated with the first thumbnail, wherein responsive to the first thumbnail being released in the drop region, a mirroring grid of thumbnails presented on the AVD presents the media asset to play in the mirroring grid on the AVD in a location in the mirroring grid corresponding to a user-touched location on the mobile device.

12. The method of claim 11, comprising:

responsive to a user releasing the first thumbnail in the drop region, causing the AVD to present a player control panel on the AVD, the player control panel including control selectors for causing the media asset associated with the first thumbnail to play, rewind, and fast forward a video associated with the first thumbnail.

13. The method of claim 11, wherein the player control panel indicates by name a user of the mobile device.

14. The method of claim 11, wherein the player control panel includes an image of the first thumbnail.

15. The method of claim 12, wherein the signal sent to the AVD includes a wireless signal, and the wireless signal represents information useful by the AVD in rendering the player control panel.

16. A computer memory that is not a transitory signal and that comprises instructions executable by at least one processor to:

present on a display of an audio video device (AVD) a user interface (UI);

receive from a mobile device separate from the AVD a signal from release of a dragged first selector from a first display location on the mobile device to a second display location to cause the AVD to present a media asset associated with the first selector presented on the mobile device; and responsive to information received from the mobile device, present on the AVD a player control panel including control selectors for causing the media asset associated with the first selector on the mobile device to play; rewind, and fast forward a video associated with the first selector, wherein responsive to the first selector being released in the second display location, a mirroring; grid of thumbnails presented on the AVD is caused to disappear and the media asset is presented substantially full-screen on the AVD.

17. The compute memory of claim 16, wherein the AVD is a first AVD and the second display location corresponds to the first AVD, and the instructions are executable to present a third display location corresponding to a second AVD such that releasing the first selector in the second display location causes the media asset to be played on the first AVD and releasing the first selector in the third display location causes the media asset to be played on the second AVD.

18. The computer memory of claim 1, wherein responsive to the first thumbnail being released in the drop region, a mirroring grid of thumbnails presented on the AVD is caused to disappear and the media asset is presented substantially full-screen on the AVD.

19. The computer memory of claim 16, wherein responsive to the first selector being released in the second display location a mirroring grid of thumbnails presented on the AVD presents the media asset to play in the mirroring grid on the AVD in a location in the mirroring grid corresponding to a user-touched third display location on the mobile device.

20. A computer memory that is not a transitory signal and that comprises instructions executable by at least one processor to:

present on a display of an audio video device (AVD) a user interface (UI);

receive from a mobile device separate from the AVD a signal from release of a dragged first selector from a first display location on the mobile device to a second display location to cause the AVD to present a media asset associated with the first selector presented on the mobile device; and responsive to information received from the mobile device, present on the AVD a player control panel including control selectors for causing the media asset associated with the first selector on the mobile device to play, rewind, and fast forward a video associated with the first selector, wherein responsive to the first selector being released in the second display location, a mirroring grid of thumbnails presented on the AVD presents the media asset to play in the mirroring grid on the AVD in a location in the mirroring grid corresponding to the first display location on the mobile device.

* * * * *